(12) United States Patent
Smith et al.

(10) Patent No.: US 9,718,002 B2
(45) Date of Patent: Aug. 1, 2017

(54) CONTINUOUS EVAPORATIVE CONCENTRATION OF USED DRILLING MUDS

(71) Applicant: Highland Fluid Technology, Ltd., Houston, TX (US)

(72) Inventors: Kevin Smith, Bellaire, TX (US); Alan Rossiter, Bellaire, TX (US)

(73) Assignee: Highland Fluid Technology, Ltd., Houston, TX (US)

( * ) Notice: Subject to any disclaimer, the term of this patent is extended or adjusted under 35 U.S.C. 154(b) by 493 days.

(21) Appl. No.: 14/504,072

(22) Filed: Oct. 1, 2014

(65) Prior Publication Data

US 2016/0096122 A1    Apr. 7, 2016

(51) Int. Cl.
| | | |
|---|---|---|
| *B01D 17/02* | (2006.01) | |
| *B01D 17/04* | (2006.01) | |
| *B01D 1/14* | (2006.01) | |
| *E21B 21/06* | (2006.01) | |
| *B03D 1/00* | (2006.01) | |

(52) U.S. Cl.
CPC ........... *B01D 17/0205* (2013.01); *B01D 1/14* (2013.01); *B01D 17/04* (2013.01); *B01D 17/042* (2013.01); *B01D 17/047* (2013.01); *B03D 1/00* (2013.01); *E21B 21/063* (2013.01)

(58) Field of Classification Search
CPC ...... B01D 1/14; B01D 17/0205; B01D 17/04; B01D 17/042; B01D 17/044; B01D 17/047

See application file for complete search history.

(56) References Cited

U.S. PATENT DOCUMENTS

| | | | |
|---|---|---|---|
| 1,061,142 | A | 5/1913 | Tesla |
| 3,198,191 | A | 8/1965 | Wyszomirski |
| 3,533,480 | A | 10/1970 | Chenevert |
| 4,231,867 | A | 11/1980 | Sutphin |
| 4,437,940 | A | 3/1984 | Sussmeyer et al. |
| 4,481,109 | A | 11/1984 | Stewart |
| 4,514,139 | A | 4/1985 | Gurth |
| 4,533,366 | A | 8/1985 | Bland |
| 4,773,819 | A | 9/1988 | Gurth |
| 5,211,856 | A | 5/1993 | Shen |
| 5,240,617 | A | 8/1993 | Hopf |
| 5,445,731 | A | 8/1995 | Tuohey et al. |
| 5,931,153 | A | 8/1999 | Giebeler et al. |
| 6,016,798 | A | 1/2000 | Selivanov |
| 6,164,274 | A | 12/2000 | Giebeler et al. |

(Continued)

*Primary Examiner* — Renee Robinson
(74) *Attorney, Agent, or Firm* — Beck & Thomas, P.C.

(57) ABSTRACT

Used water-in-oil emulsified drilling muds are prepared for reuse by removing excess water. The excess water is removed by passing the used mud through a cavitation device, under controlled conditions, along with injected air. While the emulsion is heated in the cavitation device, the air is finely dispersed in it, so is able to absorb water evaporated from the discrete, discontinuous phase aqueous droplets in the emulsion. A mixture of incoming and aerated emulsion is maintained at an optimal temperature in a process tank while a steady state continuous process is controlled to utilize the heat input, after compensating for radiant heat losses and other system losses, substantially exclusively for the evaporation of water in the emulsion. The process is applicable to any water-in-oil emulsion.

17 Claims, 3 Drawing Sheets

(56) References Cited

U.S. PATENT DOCUMENTS

| | | | |
|---|---|---|---|
| 6,193,893 B1 * | 2/2001 | Mazzei | B01D 17/0205 |
| | | | 210/198.1 |
| 6,214,219 B1 | 4/2001 | Fisher | |
| 6,315,532 B1 | 11/2001 | Appleby | |
| 6,533,929 B2 | 3/2003 | Binsfeld et al. | |
| 6,566,410 B1 | 5/2003 | Zaki et al. | |
| 6,595,759 B2 | 7/2003 | Crosta et al. | |
| 6,596,178 B1 | 7/2003 | Archibald et al. | |
| 6,627,784 B2 | 9/2003 | Hudson et al. | |
| 6,849,175 B2 | 2/2005 | Kresnyak | |
| 6,910,448 B2 | 6/2005 | Thoma | |
| 6,959,669 B2 | 11/2005 | Thoma | |
| 6,976,486 B2 | 12/2005 | Thoma | |
| 7,089,886 B2 | 8/2006 | Thoma | |
| 7,546,874 B2 * | 6/2009 | Smith | E21B 21/063 |
| | | | 166/267 |
| 7,553,124 B1 | 6/2009 | Jimenez | |
| 7,705,058 B2 | 4/2010 | Coutinho et al. | |
| 7,736,518 B2 | 6/2010 | Smith et al. | |
| 8,042,989 B2 | 10/2011 | Gordon et al. | |
| 8,597,524 B2 | 12/2013 | Donnelly | |
| 2009/0056645 A1 | 3/2009 | Hobbs et al. | |
| 2012/0014779 A1 | 1/2012 | Gilliam | |
| 2012/0291765 A1 | 11/2012 | Griggs | |

* cited by examiner

CONTINUOUS EVAPORATIVE CONCENTRATION OF USED DRILLING MUDS

TECHNICAL FIELD

Used water-in-oil emulsified drilling muds are prepared for reuse by removing excess water. The excess water is removed by passing the used mud through a cavitation device, under controlled conditions, along with injected air. While the emulsion is heated in the cavitation device, the air is finely dispersed in it, so is able to absorb water evaporated from the discrete, discontinuous phase aqueous droplets in the emulsion. A mixture of incoming and aerated emulsion is maintained at an optimal temperature in a process tank while a steady state continuous process is controlled to utilize the heat input, after compensating for radiant heat losses and other system losses, substantially exclusively for the evaporation of water in the emulsion. The process is applicable to any water-in-oil emulsion.

BACKGROUND OF THE INVENTION

Used water-in-oil drilling muds, as they are returned from the well, are virtually unfit for reuse without rejuvenation. They contain drill cuttings and other solids, which can be removed in a known manner, but the most difficult problem with the remaining fluid is that it contains too much water. Drilling fluids are commonly in the form of water-in-oil emulsions, typically having an original ratio of 70-90% oil to 10-30% water (by volume), apart from the solids content. The oil/water ratio influences the rheology of the fluid and is an important factor in maintaining the drilling mud properties. For example, when a 90/10 ratio emulsion returns to the surface after use, it might have been diluted to perhaps 70/30 v/v in addition to entraining significant amounts of solids such as drill cuttings. The used mud will also commonly contain other materials picked up from the formation and may have changed chemically and physically in other respects; in addition it is likely to have reduced contents of one or more beneficial additives, but the major difficulty is that, to restore its usefulness, the ratio of oil to water must be restored to the desired figure. One way to do this is to add more oil and other ingredients, which requires more storage and increases the cost of the fluid by the amount of excess oil and ingredients required. In some cases it takes literally two times the original volume to correct the oil/water ratio.

For example, if the original volume/volume ratio was 9.0 oil/1.0 water (10% water by volume), and the returned material is 8.0 oil/2.0 water (20% water), restoring it to the desired ratio of 9:1 by adding oil would require ten (10) volumes of oil, doubling the overall quantity and creating problems in both mixing and storing. Ratios lower than 8:2 are common in the returned fluid. The problem is even more severe for a ratio of, for example, 7:3—to restore this mixture to 9:1 with oil alone would require about 3.85 volumes of oil.

Both environmentally and economically, it is very desirable to recycle used drilling mud. Doing so greatly reduces the need for water and additional drilling chemicals, but also drastically alleviates the waste disposal problems of the operators.

The desired ratio of oil to water can be restored by removing excess water rather than adding oil and the other drilling fluid ingredients. The original emulsions, however, were carefully constructed using excellent emulsifiers, and are difficult or expensive, or both, to break by chemical means or by simple boiling even when additional water has upset the original emulsification balance. On the other hand, used drilling fluids have been subjected to great stress, and the original even dispersion is seldom preserved—that is, the discontinuous phase will have been disrupted and reconstituted by those excellent emulsifiers, now having additional water to work with, to a range of sizes not conducive to good purpose for reuse in a well. The process of reducing the high water content of a used mud should include, if possible, an even redistribution of the discontinuous phase in the desired dimensions. Another common characteristic of drilling fluids is that they contain significant amounts of calcium chloride, deliberately added to "hold" the water in the emulsion as it is subjected to turbulence and stress. The presence of the calcium chloride makes the task of removing water from the emulsion more difficult. A practical method of restoring the original ratio should conserve time and expense. The ability to process the used mud on return to the surface would help to reduce storage of the mud and inventory of various ingredients. A practical method of removing water from water-in-oil emulsions, particularly one which can lead to ready-to-use drilling muds, is needed.

SUMMARY OF THE INVENTION

Our invention employs a cavitation device to process water-in-oil emulsions, such as drilling mud, with air. The cavitation device has several highly useful effects, namely (1) it heats the emulsion, (2) it causes water in the emulsified water droplets to vaporize (3) it finely divides the air, generating very high air surface areas in the simultaneously heated emulsions, facilitating intimate contact with the vaporized water, in turn enabling the air to entrain the vaporized water, and (4) it creates an evenly distributed, smooth emulsion from one that, as is typically the case, exhibits noticeable stratification of oil and solids settling. The cavitation device can do all of this while handling a fluid having a significant solids content. However, there are many practical constraints on the mud restoration process that require much more than simply passing the emulsion through the cavitation device. Without additional steps and proper process control, the cavitation device alone cannot produce the desired emulsion from an undesirable one.

For example, we have observed that a careful control of temperature in the process is important for efficient energy usage. An object of our process is to evaporate water from the emulsion; therefore heating the oil in the emulsion to temperatures higher than the boiling point of water is not only unnecessary but inefficient. Because the oil in the mud has a boiling point higher than that of water, and is present in much greater amounts than the water, it can act more or less as a heat sink, taking up heat energy without a direct benefit. Moreover, because our process includes recycling of the process mixture through the cavitation device, maintaining a temperature in the oil higher than 212° F. or the boiling point of the water phase of the emulsion would not only be unnecessarily time-consuming but also waste a portion of the power consumed in recycling the mud. Ideally, the heat energy input to the mud will continuously equal the heat of evaporation of the water removed. We are able to maintain such an equilibrium at temperatures lower than 212° F.

Also, a continuous process requires that the air and water vapor mixture must be able to escape the system; otherwise the heat energy needed for vaporization of the water will remain in the system and cause the oil to increase in temperature until it reaches its boiling point. "Super" heating the oil will then only contribute to a superheating of the water vapor, which is not necessary, and wasteful, for the process. Ideally, our process introduces only the amount of heat energy required to vaporize the portion of water we need or want to remove. Our process takes into account the fact that the mud cools as water vapor escapes, taking with it the heat of vaporization. We maintain a base temperature in the process tank of at least 180° F., preferably not lower than 188° F., and most preferably 190 to 200° F. so that the continuous injection of heat energy into the tank, while air and water vapor are continuously removed, is employed to evaporate water rather than to heat the oil to any higher temperature.

Another factor is that the vapor captured by the air should be disposed of in a manner that does not unduly waste heat. Otherwise for every pound of water vapor released to the atmosphere, approximately 1000 BTU of energy is lost.

The air is also heated in the process and, if vented, carries away heat energy. Thus, ideally, the captured water vapor will be separated from the air and the warm dry air (or its heat energy) somehow recycled. There are a number of conventional methods used to recycle heat in a gas or liquid, including mechanical vapor recompression, heat pipes, or using the hot vapor to preheat the fluid coming into the process. All of these known methods essentially convert the heat of vaporization back into the heat of condensation so it can be reused as heat to further drive the process. Another advantage of condensing the water vapor is that it provides a convenient way to measure the amount of water evaporated, since the ultimate goal is to produce a drilling fluid with the proper ratio of oil and water; evaporating too much water is to be avoided as unnecessarily expensive and time-consuming.

Yet another problem is controlling the process to make an emulsion having ingredients essentially ready for reuse. All of this must be considered while acting on an emulsion for which one may have only an imperfect idea of its composition other than the oil/water ratio.

And overall, an efficient continuous process requires maintaining steady-state conditions throughout, or at least at several points in the system. Typically the water, oil and solids in a drilling mud are determined by a retort test done that heats the fluid to very high temperatures such that both the water and oil boil out of the fluid and are collected in a graduated cylinder to determine the volume ratio of oil to water. The test works, but takes time to complete. It is advantageous to have a mathematical model that predicts the amount of water evaporated with time in the particular system. Such a model must account for the specific heats of the oil, water and solids. Furthermore air volumes, flow rates, mud volumes, accurate temperatures should be known.

Our invention removes water by a form of evaporation, without the need to reach the normal boiling point of water, and without "super" heating the oil such that most of the energy goes into evaporation.

Because we use injected air to absorb water vapor, and because the vapor is absorbed by the air in the partial vacuum of the cavitation device, the aerated emulsion in the cavitation device is well below 212° F.; we maintain it no lower than 180° F. and preferably no higher than 200° F.

Since the system is dynamic, it requires controls which are further discussed below. Also, we have developed a startup procedure to implement the continuous process. Our process will be explained further with reference to the drawings.

DETAILED DESCRIPTION OF THE INVENTION

Figure 1:
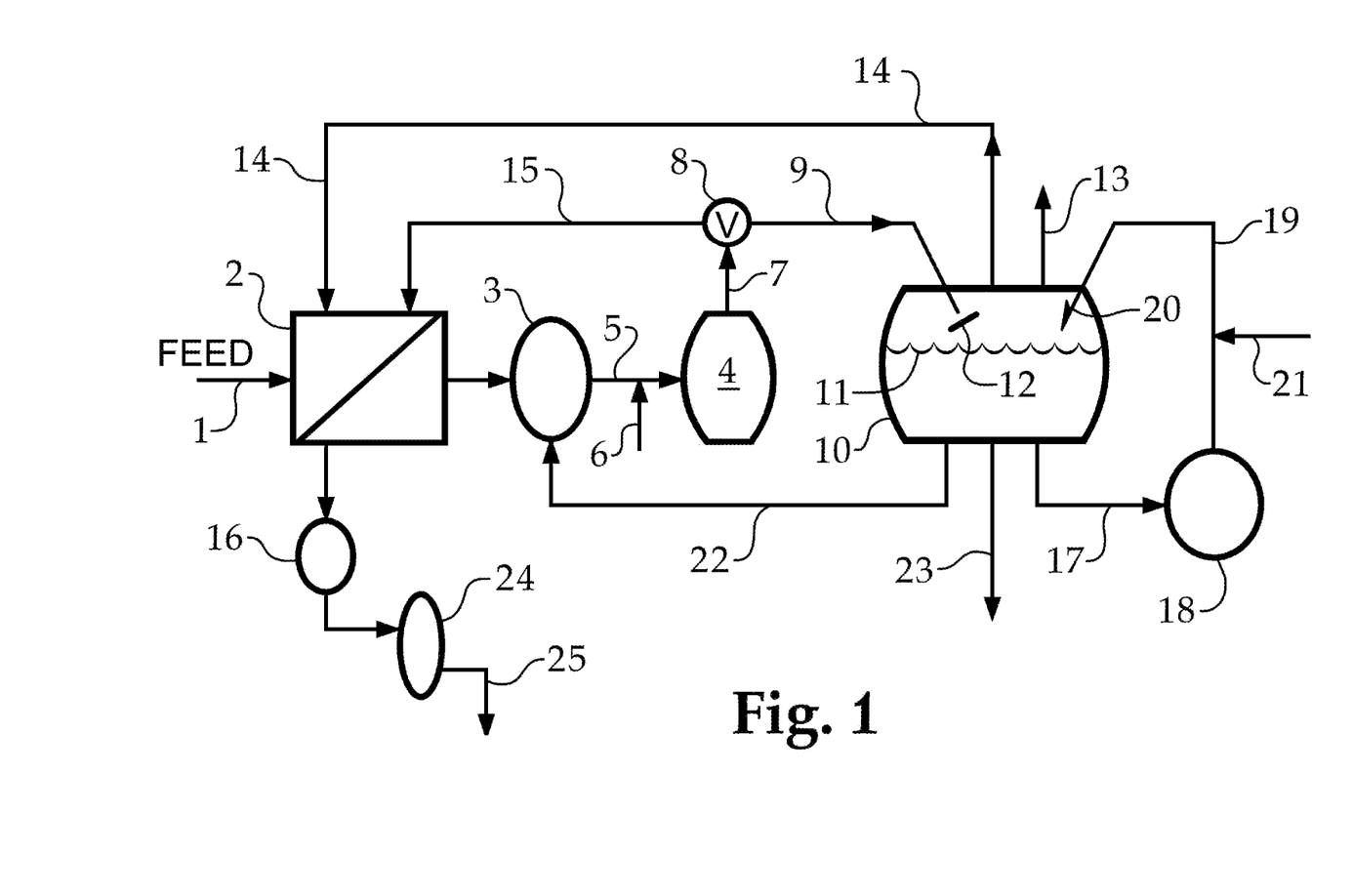
FIG. 1 is a flow sheet showing the basic invention.

Referring to FIG. 1, the used emulsion (hereafter sometimes called a drilling mud or simply "mud") in conduit 1, designated "Feed," is pumped through a heat exchanger 2 to a pump 3. The heat exchanger 2 heats the used emulsion to at least 140° F., transferring heat from at least one of two or more different sources in conduits 14, 15, and optionally conduit 23, which can be directed to run through heat exchanger 2, as will be further explained. Pump 3 sends the heated used emulsion through conduit 5 to cavitation device 4. Air is added to the heated mud in conduit 5 through compressed air line 6. The air may be dried in any convenient manner, before or after compressing. In the cavitation device 4, the mud and air are further heated and intimately mixed as will be explained further below. From the cavitation device 4, the heated, now aerated mud is sent through conduit 7 to a valve 8. A portion of the heated, aerated mud may be recycled through conduit 15 to the heat exchanger 2; this will join the feed in conduit 1 and pick up additional heat energy while passing through the heat exchanger 2 before being sent again to pump 3. Most of the material in conduit 7 is sent by valve 8 through conduit 9, which passes through the top of process tank 10, terminating in the air space above liquid level 11 which defines the top of the process mixture in tank 10. Situated directly in the path of the mud emitted from line 9 is a splash plate 12. Splash plate 12 is a metal plate oriented to receive the heated, aerated mud and cause it to splash and break up on entering process tank 10.

The action of the cavitation device 4 has caused a significant portion of the water in the emulsion to evaporate, and be absorbed into the air which is dispersed in the mud. As the heated, aerated mud strikes the splash plate 12, a portion of the air, with its thus entrained water vapor, is liberated from the mud and released into the air space in tank 10 over liquid level 11. Air and water vapor are removed from process tank 10 either through a vent 13 or by a vacuum drawn through conduit 14. Vent 13 simply releases the vapor-laden air to the atmosphere; because we normally condense as much vapor as possible to conserve its heat energy and to measure the condensed water volume, vent 13 is normally closed so that air and water vapor may escape through conduit 14. Conduit 14 directs the vapor-laden air to heat exchanger 2, where its heat is transferred to the incoming feed while also condensing the vapor; a vacuum may be applied by vacuum pump 16, and condensation of the water vapor may be completed in condenser 24. Liquid water in conduit 25 may be collected for measurement and possibly for other uses. Additional air may be injected into the system in a loop comprising a pump 18 for removing liquid from tank 10 through conduit 17 and returning it through conduit 19 to tank 10 after injecting more air from compressed air source 21. Conduit 19 has a terminus 20 within tank 10 preferably above liquid level 11. A second recycle loop may be provided as illustrated by conduit 22, which returns mud (process mixture) from tank 10 to pump 3, where it is passed through cavitation device 4 again after mixing with feed from lines 1 and 5 and after receiving more air from compressed air line 6. The finished, reprocessed mud, having a (now higher) desired ratio of oil to water, is removed in conduit 23 and can be stored or sent directly to a drilling site for use. Conduit 23 may be directed to pass through heat exchanger 2 for additional heat energy savings before storage or use. Its makeup may be adjusted for a general or particular use by adding various chemicals such as fluid loss agents or weighting agents in line or during storage.

Thus our basic process is a method of removing water from a water-in-oil emulsion comprising (a) injecting air into the emulsion, (b) passing the emulsion containing injected air through a cavitation device, thereby forming bubbles of air and entraining water vapor in the bubbles of air, and (c) separating at least some of the bubbles of air containing water vapor from the emulsion. The emulsion may be any water-in-oil emulsion from which it is desired to remove water. As a practical matter, most used oil field emulsions will have a ratio of at least 70:30 oil to water, by volume.

While any satisfactory method may be used to separate the air containing water vapor from the emulsion as in step (c), we find that splash plate 12 is especially efficient. Drilling fluids use chemical emulsifiers to hold water in the emulsion. Also, drilling fluids are typically weighted and have a base level of viscosity. Viscous drag and physical tie up of the water molecules with the hydrates of calcium chloride and chemical emulsifiers inhibit even the air bubbles that have positive pressure from getting out of the fluid with the water vapor. The splash plate obviates the element of viscous drag, first by impact and then by spreading out the emulsion in a thin layer that cascades into the process tank. The splash plate is superior to most jets for our purposes because their orifices plug quickly with fluid loss additives and solids in the fluid.

In spite of the inhibiting action of emulsifiers on release of the air bubbles, we have found that, in many cases, it is beneficial to add emulsifiers if there are not enough emulsifiers in the emulsion, as the excellent mixing action of the cavitation device will assure an improved distribution and emulsifying effect. The addition may be made anywhere in the system, but is particularly effective when added upstream of a cavitation device, as before the injection of air in line 6, or after it; it may also be added simultaneously with the air.

An efficient process will entail controls to (a) maintain a temperature of at least 140° F. in the mixture of mud and air entering the cavitation device from conduit 5, (b) and maintain a temperature of at least 188° F., preferably at least 190° F., in the liquid in tank 10. The mud entering the cavitation device is desirably between 140° F. and 150° F., and the temperature in the tank 10 is desirably 190° F. to 200° F. Controlled variables which may be used to maintain those temperatures include (a) the feed rate of original used mud in line 1 and its original temperature, (b) the temperature and flow rate (as determined by the position of valve 8) of the recycled aerated mud in conduit 15, as well as the heat exchange efficiency in heat exchanger 14, (c) the flow rate and temperature of material removed for recycle in conduit 17 (adjusting for the injection of air in line 21), (d) the flow rate and temperature of aerated mud entering tank 10 through conduit 9, (e) the flow rate and temperature of finished reprocessed mud being removed from tank 10 in conduit 23, (f) the flow rate and temperature of vented air and water vapor in vent 13, if any, (g) the flow rate and temperature of mud recycled to cavitation device 4 through conduits 22 and 5, (h) the flow rate and temperature of air injected into the system, (i) the flow rate and temperature of water vapor laden air removed from the system through conduit 14, and (j) the RPM's of the cavitation device and/or its power input. Instead of the flow rate of vapor-laden air in variable (i), one may measure the amount of water condensed, or may periodically perform a retort test as explained elsewhere herein. A particular liquid level in tank 10 is not critical, but maintenance of steady-state conditions will be simplified if a level control is implemented. A mathematical model may be constructed for installation in a computer control system to implement the process in equipment of particular specifications, using all or most of the above criteria.

It is known that the presence of small air bubbles in a fluid will reduce turbulence when it is flowing in a conduit. Accordingly, an increase of injected air will tend to reduce the pressure drop from point to point, tending in turn to increase the flow or reduce power requirements for the pumps. This phenomenon may also be taken into account in constructing the model and also in choosing pumps, conduit sizes, valves, and other equipment. Also, over a wide range of air content in the fluid, the amount of water vapor removed will increase with the amount of air present even if the temperature is reduced slightly. But, as indicated above, the dynamic nature of the system means the user must be aware of other effects of a high air content, as it permeates the entire system. For example, a high air content may increase the flow rate in a given conduit, which in turn may affect radiant heat loss.

Heat exchanger 2 may be of any conventional construction. Its main purpose is to elevate the temperature of the incoming mud prior to entering cavitation device 4 while conserving heat energy from the product water vapor in conduit 14. While the cavitation device 4 will increase the temperature even more, its plural function of dispersing the air, homogenizing the emulsion, and heating the emulsion is performed more efficiently if the incoming temperature of the mud is elevated somewhat. The air/vapor mixture in conduit 14 passes directly through heat exchanger 2, contacting a heat transfer surface, not shown, for heating the incoming mud feed. The recycled mud in conduit 15 merges with the incoming mud; it may contribute heat also to the incoming mud through a heat transfer surface, or not. A supplemental heater may be used to provide additional heat to the incoming mud.

Fluid flow rates, heat inputs, recycles, and air injection rates are preferably controlled to maintain a desired level 11 in process tank 10 and the temperature in process tank 10 no lower than 180° F., preferably no lower than 188° F. Any appropriate automatic control devices may be used. The heat exchanger 2 should be capable of elevating the temperature of incoming "feed" used mud in conduit 1 to 150° F.

Figure 2:
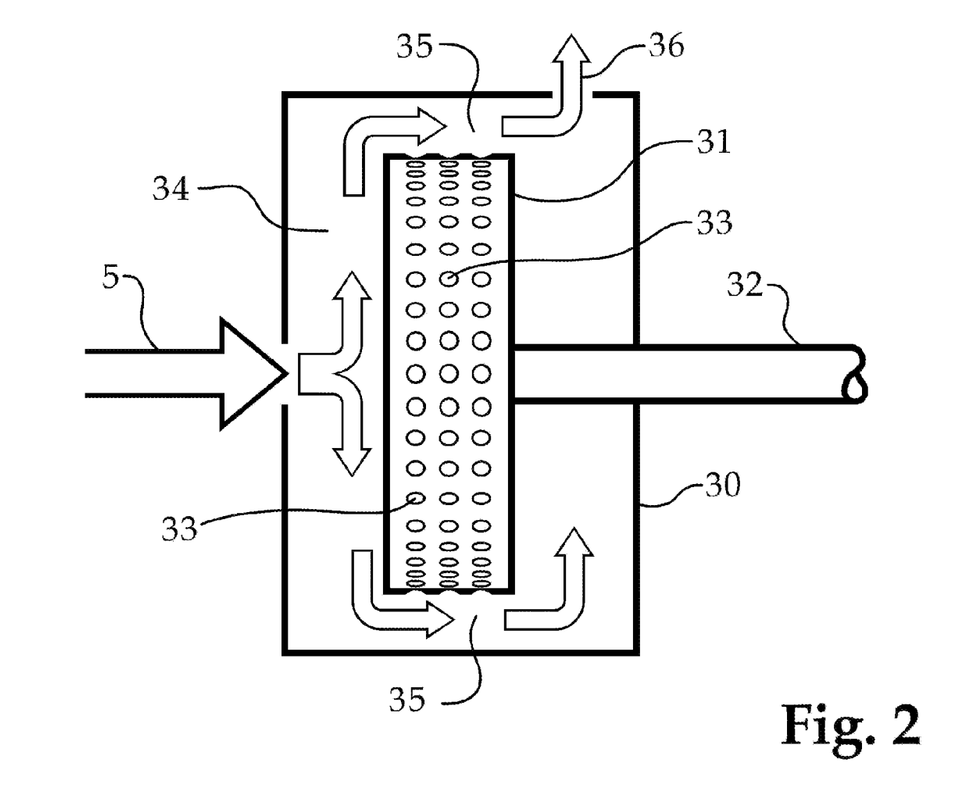
FIG. 2 illustrates a cavitation device such as may be used as cavitation device 4 in FIG. 1.

Referring now to FIG. 2, a cavitation device useful as the cavitation device 4 of FIG. 1 is shown in outline form. The cavitation device comprises a housing 30, which is cut away for illustration to expose cylinder 31 mounted on motorized shaft 32. Shaft 32 passes through housing 30 with suitable seals and bearings not shown and is fixed centrally to cylinder 31. Housing 30 has a cylindrical internal surface substantially concentric with the cylindrical surface of cylinder 31. On the cylindrical surface of cylinder 31 are a plurality of cavities 33 which may be bored or otherwise formed on the surface. Preferably they are distributed evenly as shown or otherwise. Fluid to be processed, in this case the used mud which contains added air as explained with reference to FIG. 1, enters housing 30 from conduit 5 and is immediately dispersed, as shown by the arrows, to the space 34 between the face of cylinder 31 and housing 30, flowing then into the confined space 35 between housing 30 and the cylindrical surface of cylinder 31. Aerated mud entering the confined space 35 between housing 30 and the rapidly rotating cylinder 31 tends to enter cavities 33 but is immediately ejected by centrifugal force, creating a mini-vacuum which is immediately violently filled. This cavitation effect imparts heat energy to the fluid while evenly and finely dispersing the constituents of the emulsion. In the process, fine bubbles are formed of the air, which is able to entrain water vapor as it is freed from the emulsion. The mud thus processed exits the cavitation device through an exit port 36 leading to, in FIG. 1, conduit 7. By regulating the revolutions per minute (RPM) of the cylinder 31, temperatures within the cavitation device should be maintained no lower than 180° F.

The cavitation device 4 need not be designed exactly as depicted in FIG. 2. Devices which create similar cavitation effects are known, as seen in U.S. Patents to Griggs (U.S. Pat. Nos. 5,188,090, 5,385,298, and 5,957,122), Hudson et al U.S. Pat. No. 6,627,784, Wyszomerski U.S. Pat. No. 3,198,191, Selivanov U.S. Pat. No. 6,016,798, Thoma U.S. Pat. Nos. 7,089,886, 6,976,486, 6,959,669, 6,910,448, and 6,823,820, Costa et al U.S. Pat. No. 6,595,759, Giebeler et al U.S. Pat. Nos. 5,931,153 and 6,164,274, and Archibald et al U.S. Pat. No. 6,596,178, all of which are hereby specifically incorporated herein by reference in their entireties. A cavitation device, as the term is used herein, includes any of the devices depicted in the above incorporated patents as well as cavitation device 4 of FIG. 1. As the term is used herein, a cavitation device is any device which will impart thermal energy to flowing liquid by causing bubbles or pockets of partial vacuum to form within the liquid it processes, the bubbles or pockets of partial vacuum being quickly imploded and filled by the flowing liquid. The bubbles or pockets of partial vacuum have also been described as areas within the liquid which have reached the vapor pressure of the liquid. The turbulence and/or impact, which may be called a shock wave, caused by the implosion imparts thermal energy to the liquid, which, in the case of water, may readily reach topical boiling temperatures. The bubbles or pockets of partial vacuum are typically created by flowing the liquid through narrow passages which present side depressions, cavities, pockets, apertures, or dead-end holes to the flowing liquid; hence the term "cavitation effect" is frequently applied. Commonly there is a shearing effect in the narrow passages between two close surfaces, at least one of which is moving.

It should be understood that the capability of forming bubbles or pockets in the above description relates to the processing of a liquid which has not been injected with air or other gas. The addition of air as called for by the present invention does not alter the cavitation effect on the liquid, but facilitates the evaporation of water from it; the water vapor is captured by the injected air, the surface area of which has been greatly multiplied by the action of the cavitation device.

Figure 3:
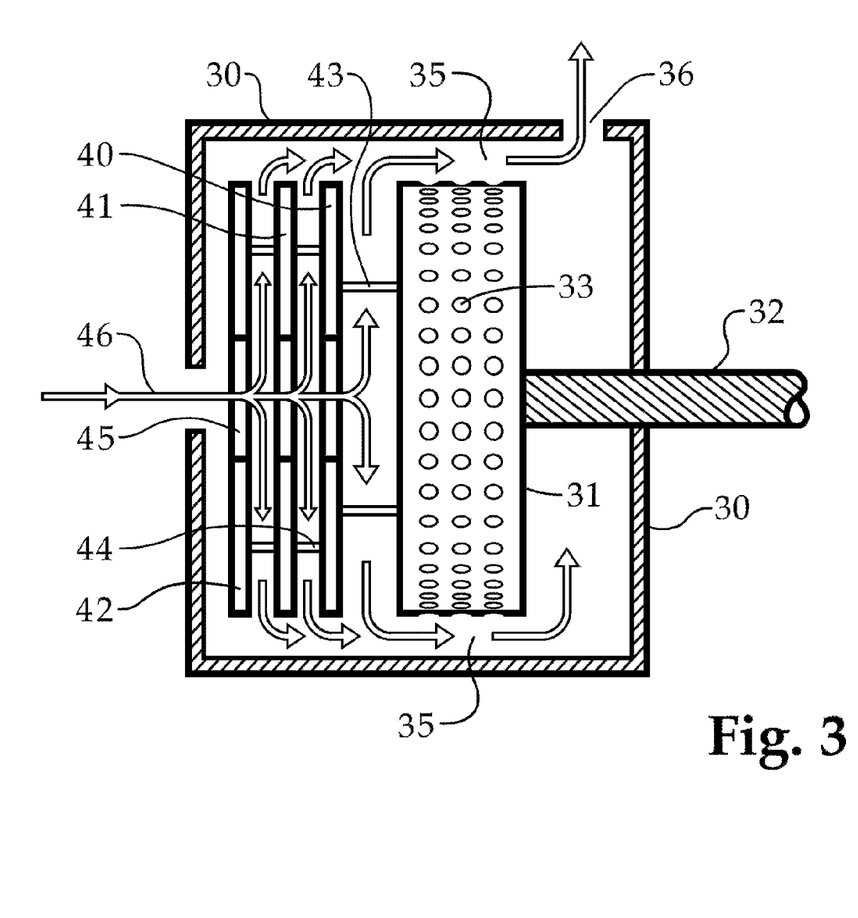
FIG. 3 is a cavitation device equipped with an integral disc pump; this modified cavitation device may replace cavitation device 4 in FIG. 1 or pump 18 in FIG. 3, as will be explained.

A modified cavitation device is shown in FIG. 3. As in FIG. 2, cylinder 31 mounted on motorized shaft 32 fits concentrically into cylindrical housing 30 and has a number of cavities 33 on its cylindrical surface. The device is modified by including three discs 40, 41, and 42 which are mounted by disc supports 43 and 44 in planes substantially parallel to cylinder 31. Discs 40, 41, and 42 each have a central orifice 45. Operation of the modified cavitation device is as follows. Material to be processed, in this case for example the process mixture to be recycled from tank 10 through conduit 17 (FIG. 1), enters the housing 30 as indicated by arrow 46 and passes through the orifices 45 of discs 40, 41, and 42 while also being distributed between them, as indicated by the arrows. Additional air may be injected into conduit 17 from a source such as source 21. Since the discs 40, 41, and 42 are attached to cylinder 31 by supports 43 and 44, they turn with it as the motor (not shown) turns shaft 32. Discs 40, 41, and 42 thus act as a disc pump (and may be called a "disc pump fixture"), obviating the need for an external pump. The process mixture from process tank 10 is passed through confined space 35 in a manner similar to that described for FIG. 2, and continues through exit 36, in this case to go by way of a conduit such as conduit 19 (FIG. 1) directly to process tank 10. Although air has already been added, more air can be injected as from source 21 in the configuration of FIG. 1 if it is deemed desirable.

The number of discs in the modified cavitation device of FIG. 3 need not be limited to three. Any number of discs which will provide the desired pumping effect is satisfactory. Faces of the discs need not be smooth—slight projections may assist the centrifugal force effect of the discs, as is known in the pump art.

The modified cavitation device of FIG. 3 can simplify the model and control requirements of the system by replacing both pump 3 and cavitation device 4. As indicated above, discs 40, 41, and 42 act as a pump. Since they are integral with the cavitation device housing 30 and rotor 31, we are able to eliminate pump 3 as a controlled variable in our model—controlling the rotation of shaft 32 by regulating its motor (not shown) will control both the pump action of the discs and the cavitation action of cavitation rotor 31.

Similarly, the modified cavitation device of FIG. 3 may be used in place of pump 18, receiving fluid from tank 10 and recirculating it to tank 10. In this case, air injection source 21 may remain as shown or may be placed on line 17 to inject air upstream of the modified cavitation device. The rotation of rotor 31 would also operate the disc pump action as explained with reference to FIG. 3. Emulsifiers and/or other fluid additives may be added in this recycle loop also where needed or desired.

The compressed air may be dried, and is desirably typical of industrial plant air that includes a mechanical separation of water from the compressed air to prevent corrosion in plant air lines and associated equipment. The air can be further dried with various mechanical devices and chemical methods including desiccants and membranes to yield an ultra-low dew point; however, generally ordinary plant air (air having a dew point lower than 0° F.) is sufficient. Otherwise, larger quantities of air may be required than are necessary.

The continuous process described above with respect to FIG. 1 may be varied somewhat. For example, one or more additional auxiliary heaters may supplement heat exchanger 2; a heater may be placed inside process tank 10 or an external source of supplemental heat may be used to compensate for radiant heat losses in the system. A recycle line may pass directly from the downstream end of the cavitation device back to the upstream end, with provision for recycling as much as 99 percent or none at all.

Our invention includes a startup procedure for processing a used drilling mud having a known ratio of oil to water as determined by retort or otherwise. Our startup procedure has three basic steps. First, a known amount of the used emulsion of known oil/water ratio (by volume) is placed in process tank 10. It is heated to a desired temperature within the range 180-200° F. either in the process tank 10 or in a holding tank not shown, or otherwise, but is to have such a temperature in tank 10. This composition is passed, by way of conduit 22, and without replenishment in the tank, through the cavitation device by a pump such as pump 3 with the addition of air from a source 6 injected between the pump and the cavitation device, recycling it to the process tank 10 by striking splash plate 12, and venting the tank or drawing a vacuum until enough water has been removed to provide the desired volume/volume ratio of oil to water. The oil/water ratio is monitored while maintaining the desired temperature in the tank. The total volume of emulsion in the tank has now been reduced a measured amount in a measured time while the cavitation device is operating at a certain rate; these factors are used to calculate the flow of additional used fluid to the tank. The calculated inlet flow is part of a mass balance that must equal the amount of water vapor to be removed plus the amount of mud to be exported at the proper concentration. The heat balance must also be considered such that both heat and a set process tank level are maintained.

So the second basic step is to initiate the continuous process by starting the continuous addition of more used emulsion to tank 10 at a rate calculated to maintain a desired level. It is not necessary to restore the original level in tank 10, but this is an option; the mass balance and heat balance should be adjusted accordingly, and tank level is useful as a controlled variable.

For the third basic startup step, air is added to the emulsion as from source 6 prior to passing through cavitation device 4. Cavitation device 4 is controlled to maintain a desired temperature in tank 10.

Another method to maintain the temperature in the tank is to use mechanical vapor recompression to push hot air vapor mix through internal or external coils that transfer the heat of vaporization back to the process. That method requires enough compression to raise the enthalpy of the vapor. However, any convenient method of supplementing heat input to the tank 10 will be useful.

A series of tests was conducted to help define the invention. A measured amount ("batch") of used oil field emulsion was placed in a tank similar to process tank 10, equipped with means for recycling it through a cavitation device as in FIG. 1. The emulsion was heated to 190° F. Air injection and circulation of the emulsion were then begun. In Table 1, the oil/water ratio (by volume) is reported for the start and at two-hour checkpoints. For each batch, the total water removed is also reported.

TABLE 1

| Batch | | Start | Check 1 | Check 2 | Check3 | Check 4 | |
|---|---|---|---|---|---|---|---|
| 1 | Solids | 29.0% | 33.0% | 33.0% | 31.5% | | Total Water |
|   | Oil | 57.05 | 57.0% | 58.5% | 62% | | Removed |
|   | Water | 14.0% | 10.0% | 8.5% | 6.5% | | (as vol. % of |
|   | o/w (v/v) | 0.80/0.20 | 0.85/0.15 | 0.87/0.13 | 0.91/0/09 | | Start): |
|   | Water rmvd (bbl) | — | 2.4 | 1.10 | 1.22 | | 56.28% |
|   | Water rmvd (v. %) | — | 29% | 18% | 25% | | |
| 2 | Solids | 29.5% | 30.5% | 34% | 32.5% | 32.5% | Total Water |
|   | Oil | 55.5% | 56.5% | 55.5% | 58.5% | 61.0% | Removed |
|   | Water | 15% | 13.0% | 10.5% | 9.0% | 6.5% | (as vol. % of |
|   | o/w (v/v) | 0.79/0.21 | 0.81/0.19 | 0.84/0.10 | 0.87/0.13 | 0.90/0.10 | Start): |
|   | Water rmvd (bbl) | — | 1.20 | 1.63 | 1.03 | 1.50 | 59.45% |
|   | Water rmvd (v. %) | — | 13% | 21% | 17% | 29% | |
| 3 | Solids | 31.0% | 33.0% | 33% | 35.5% | | Total Water |
|   | Oil | 56.5% | 57.5% | 60.0% | 60.5% | | Removed |
|   | Water | 12.5% | 9.5% | 7.0% | 4.0% | | (as vol. % of |
|   | o/w (v/v) | 0.82/0.18 | 0.86/0.14 | 0.90/0.10 | 0.94/0.06 | | Start): |
|   | Water rmvd (bbl) | — | 1.80 | 1.63 | 1.81 | | 69.83 |
|   | Water rmvd (v. %) | — | 24% | 29% | 44% | | |
| 4 | Solids | 31.0% | 32.5% | 34.5% | 34.5% | | Total Water |
|   | Oil | 56.5% | 58.0% | 59.0% | 63.0% | | Removed |
|   | Water | 12.5% | 9.5% | 6.5% | 2.5% | | (as vol. % of |
|   | o/w (v/v) | 0.82.0.18 | 0.86/0.14 | 0.90/0.10 | 0.96/0.04 | | Start): |
|   | Water rmvd (bbl) | — | 1.80 | 1.92 | 2.38 | | 81.24% |
|   | Water rmvd (v. %) | — | 24% | 34% | 63% | | |
| 5 | Solids | 30.0% | 30.5% | 31.5% | 33.0% | | Total Water |
|   | Oil | 57.0% | 59.5% | 61.0% | 62.0% | | Removed |
|   | Water | 13.0% | 10.0% | 7.5% | 5.0% | | (as vol. % of |
|   | o/w (v/v) | 0.81/0.19 | 0.86/0.14 | 0.89/0.11 | 0.93/0.07 | | Start): |
|   | Water rmvd (bbl) | — | 1.80 | 1.64 | 1.54 | | 63.74% |
|   | Water rmvd (v. %) | — | 23% | 27% | 35% | | |
| 6 | Solids | 29.5% | 29.5% | 32.5% | 33.0% | | Total Water |
|   | Oil | 58.0% | 61.0% | 61.5% | 64.0% | | Removed |
|   | Water | 12.5% | 9.5% | 6.0% | 3.0% | | (as vol. % of |
|   | o/w (v/v) | 0.82/0.18 | 0.87/0.13 | 0.91/0.09 | 0.96/0.04 | | Start): |
|   | Water rmvd (bbl) | — | 1.80 | 2.21 | 1.81 | | 77.60% |
|   | Water rmvd (v. %) | — | 24% | 39% | 52% | | |
| 7 | Solids | 34.5% | 34.5% | 34.0% | | | Total Water |
|   | Oil | 57.5% | 60.0% | 62.0% | | | Removed |
|   | Water | 8.0% | 5.5% | 3.5% | | | (as vol. % of |
|   | o/w (v/v) | 0.88/0.12 | 0.92/0.08 | 0.95/0.05 | | | Start): |
|   | Water rmvd (bbl) | — | 1.50 | 1.25 | | | 57.34% |
|   | Water rmvd (v. %) | — | 31% | 38% | | | |
| 8 | Solids | 33.5% | 34.5% | 34.5% | 35.0% | | Total Water |
|   | Oil | 56.5% | 59.5% | 61.0% | 61.0% | | Removed |
|   | Water | 10.0% | 6.0% | 4.5% | 4.0% | | (as vol. % of |

TABLE 1-continued

| Batch | Start | Check 1 | Check 2 | Check3 | Check 4 |
|---|---|---|---|---|---|
| o/w (v/v) | 0.85/0.15 | 0.91/0.09 | 0.93/0.07 | 0.94/0.96 | Start): |
| Water rmvd (bbl) | — | 2.40 | 1.01 | 0.33 | 62.27% |
| Water rmvd (v. %) | — | 40.% | 28.% | 13% | |

It will be noted that most of the batches were taken to a ratio of oil to water of greater than 9/1. Efficient practice of our method includes maintaining a substantially steady temperature in tank 10 of at least 180° F. but no higher than the boiling point of the aqueous composition in the tank. Preferably the temperature in the tank will be maintained in the range of 188-200° F. The continuous input of heat energy from cavitation device 4 and any supplemental heating means should be equivalent to the total system heat loss including heat energy in the continuously removed reconstituted product in conduit 23 and the heat of evaporation of the water removed. Although the oil boils at a temperature higher than water, there is no advantage to heating it beyond the optimal temperature for transferring heat from the oil to the aqueous phase. But because the far greater volume of the emulsion is oil, and because elevating its temperature is time-consuming, it is advantageous to continue evaporating water, while the oil is hot, beyond the exact amount needed to make a 90/10 composition, for example. A 95/5 emulsion may be made, even if some of the salts come out of solution, for storing and use as a base for reconstituting a new 90/10 emulsion at a later time. We find that such "over-evaporated" used muds are readily adapted for further use. For example, if the water phase of an 80/20 o/w emulsion contains 20,000 parts chlorides, it will still contain 20,000 parts chloride at the end of our process, but if half the water is removed, the concentration will be doubled in terms of parts per million. Thus it is part of the invention to cause the aqueous phase of the reconstituted mud to be supersaturated with at least one inorganic salt. Such a reconstituted mud can be stored and adjusted for reuse with the addition of water and other constituents at a later time.

On occasion, the operator may wish to recycle a used mud on short notice. He may have a mud having an 85:15 ratio of oil to water, for example, that he wants to use without waiting for dewatering. In this case, it is convenient to have on hand a super-concentrated used mud having, say, a 95:5 ratio, having been processed by our method. An equal amount of such a stored mud mixed with the 85:15 mud will yield the desired 90:10 emulsion. Our invention therefore includes mixing the stored super-concentrated used mud (one having at least one inorganic salt in an amount greater than saturation) with a separate used drilling mud emulsion including inorganic salts in amounts lower than saturation amounts, to make an emulsion having a desired oil to water ratio.

Therefore it is seen that our invention includes a method of removing water from a water-in-oil emulsion comprising (a) injecting air into the emulsion, (b) passing the emulsion containing injected air through a cavitation device, thereby heating the emulsion, forming bubbles of air in the emulsion, and entraining water vapor in the bubbles of air, and (c) separating at least some of the bubbles of air containing water vapor from the emulsion.

The invention also includes a continuous method of removing water from a used water-in-oil drilling mud emulsion comprising (a) heating the drilling mud emulsion to at least 140° F., (b) injecting air into the drilling mud emulsion, to form an aerated emulsion, (c) directing the aerated emulsion into a cavitation device, whereby the aerated emulsion is heated to at least 180° F. and finely dispersed, (d) directing the aerated emulsion onto a splash plate in a process tank, thereby (i) forming a process mixture in the process tank and (ii) releasing air containing water vapor from the emulsion, (e) directing the air containing water vapor to a condenser and condensing the water vapor to form water, and (f) removing process mixture from the process tank for use as a reconstituted drilling fluid. Additional emulsifier may be injected into said emulsion before, during or after step (b).

In addition, our invention includes a method of starting up a continuous method of removing water from a used water-in-oil emulsion comprising (a) providing a known volume of the used emulsion in a tank at a temperature of 180-200° F., (b) passing the emulsion through a cavitation device together with air, thereby entraining water vapor in air within the emulsion, (c) recycling the emulsion to the tank by causing it to strike a splash plate in the tank, (d) withdrawing air and water vapor from the tank until a desired ratio of oil to water is attained in the tank, (e) calculating mass and energy balances from the time, volume of emulsion in the tank, temperatures, flow rates of the emulsion, and air input and heat energy inputs in steps (a), (b), (c), and (d), and (f) implementing the mass and energy balances to start processing the emulsion to remove water therefrom continuously.

The invention claimed is:

1. Method of removing water from a water-in-oil emulsion comprising (a) injecting air into said emulsion, (b) passing said emulsion containing injected air through a cavitation device, thereby heating said emulsion, forming bubbles of air in said emulsion, and entraining water vapor in said bubbles of air, and (c) separating at least some of said bubbles of air containing water vapor from said emulsion.

2. Method of claim 1 wherein the temperature in said cavitation device is 180-200° F.

3. Method of claim 1 wherein said water-in-oil emulsion prior to step (a) comprises oil and water in a volume to volume ratio of at least 70 oil to 30 water.

4. Method of claim 3 wherein said water-in-oil emulsion is a used drilling mud.

5. Method of claim 1 wherein, in step (c), said bubbles containing water vapor are separated from said emulsion by impacting said emulsion on a splash plate.

6. Method of claim 1 wherein said air is compressed air and including drying said air before injecting into said emulsion.

7. Method of claim 1 including adding emulsifier to said emulsion.

8. A continuous method of removing water from a used water-in-oil drilling mud emulsion comprising (a) heating said drilling mud emulsion to at least 140° F., (b) injecting air into said drilling mud emulsion, to form an aerated emulsion, (c) directing said aerated emulsion into a cavitation device, whereby said aerated emulsion is heated to at least 180° F. and finely dispersed, (d) directing said aerated emulsion onto a splash plate in a process tank, thereby (i) forming a process mixture in said process tank and (ii) releasing air containing water vapor from said emulsion, (e) directing said air containing water vapor to a condenser and condensing said water vapor to form water, and (f) removing process mixture from said process tank for use as a reconstituted drilling fluid.

9. Method of claim 8 wherein said used water-in-oil drilling mud emulsion prior to step (a) comprises oil and water in a volume/volume ratio of 70 oil:30 water.

10. Method of claim 9 including monitoring the formation of water in step (e) as an input variable to control the ratio of oil and water in said process mixture.

11. Method of claim 8 including recycling a portion of said heated, aerated emulsion formed in step (c) to mix with said drilling mud emulsion in step (a).

12. Method of claim 8 including recycling a portion of said process mixture from said process tank and returning to said process tank after injecting additional air.

13. Method of claim 12 including passing said recycled process mixture through a supplemental cavitation device.

14. Method of claim 13 wherein said supplemental cavitation device includes a disc pump fixture.

15. Method of claim 8 including adding emulsifier to said emulsion before, during, or after step (b).

16. Method of claim 8 wherein said used water-in-oil drilling mud emulsion includes inorganic salts in amounts lower than saturation amounts, and said process mixture removed in step (f) includes at least one inorganic salt in an amount greater than saturation.

17. Method of claim 16 including mixing said process mixture removed in step (f) with a separate used drilling mud emulsion including inorganic salts in amounts lower than saturation amounts to make an emulsion having a desired oil to water ratio.

* * * * *